(12) United States Patent
Walter et al.

(10) Patent No.: US 11,660,645 B2
(45) Date of Patent: May 30, 2023

(54) DEVICE FOR REMOVING DEPOSITS AND/OR PRECIPITATE ON A SUBSTRATE

(71) Applicant: EchoVista GmbH, Seligenstadt (DE)

(72) Inventors: Steffen Walter, Rodgau (DE); Ole Gustav Johannessen, Southampton (GB); Oliver Simon Matthews, Southampton (GB); Mincheol Shin, Southampton (GB)

(73) Assignee: EchoVista GmbH, Seligenstadt (DE)

( * ) Notice: Subject to any disclaimer, the term of this patent is extended or adjusted under 35 U.S.C. 154(b) by 0 days.

(21) Appl. No.: 17/276,171

(22) PCT Filed: Sep. 11, 2019

(86) PCT No.: PCT/EP2019/074262
§ 371 (c)(1),
(2) Date: Mar. 15, 2021

(87) PCT Pub. No.: WO2020/053298
PCT Pub. Date: Mar. 19, 2020

(65) Prior Publication Data
US 2022/0080471 A1     Mar. 17, 2022

(30) Foreign Application Priority Data
Sep. 14, 2018 (DE) .................. 10 2018 122 557.1

(51) Int. Cl.
*B08B 13/00* (2006.01)
*B08B 7/02* (2006.01)
*B60S 1/56* (2006.01)

(52) U.S. Cl.
CPC ................ *B08B 7/028* (2013.01); *B60S 1/56* (2013.01)

(58) Field of Classification Search
None
See application file for complete search history.

(56) References Cited

U.S. PATENT DOCUMENTS

2012/0243093 A1* 9/2012 Tonar .................. G02B 27/0006
359/507

FOREIGN PATENT DOCUMENTS

| TW | 201536259 | 10/2015 | |
|---|---|---|---|
| WO | WO-2012095643 A1 * | 7/2012 | ............... A42B 3/24 |
| WO | WO 2015/095721 | 6/2015 | |

* cited by examiner

*Primary Examiner* — Eric W Golightly

(57) ABSTRACT

A device (1) for eliminating deposits and/or precipitation on a substrate (10, 110) comprises at least one transducer (20, 120) captively connected to the substrate (10, 110) by a connection layer (30), wherein the connection layer (30) is arranged between the substrate (10, 110) and the transducer (20, 120). The invention provides for the connection layer (30) to comprise a connection material (31) and a filling material (32). Furthermore, an optical system for environment monitoring comprising an optical monitoring device comprising a lens and/or an observation window and the above device is provided, wherein the lens or the observation window is formed by the substrate.

8 Claims, 4 Drawing Sheets

DEVICE FOR REMOVING DEPOSITS AND/OR PRECIPITATE ON A SUBSTRATE

RELATED APPLICATIONS

This application is a National Phase of PCT Patent Application No. PCT/EP2019/074262 having International filing date of Sep. 11, 2019, which claims the benefit of priority of German Patent Application No. 10 2018 122 557.1 filed on Sep. 14, 2018. The contents of the above applications are all incorporated by reference as if fully set forth herein in their entirety.

FIELD AND BACKGROUND OF THE INVENTION

The invention relates to a device for eliminating deposits and/or precipitation on a substrate according to the preamble of Claim 1, that is to say a cleaning device.

Substrate can be understood to mean for example a sheet, a laminated glass pane, a lens of an optical system, a protective or observation screen or some other surface. Surfaces are regularly cleaned by means of manual or automatic devices, if appropriate with the addition of detergents. Such devices include for example windscreen wipers, wipers, cleaning cloths and the like.

Since a manual intervention in the cleaning process is often not possible, for example in the case of non-openable windows, windscreens of travelling motor vehicles or difficult to access observation screens in machines or inaccessible camera systems, devices for cleaning substrate surfaces are provided which do not require manual intervention. Moreover, it is regularly desirable from aesthetic or technical standpoints that the surface to be cleaned is concealed by the cleaning device as little as possible.

The background to this is that in the case of observation screens, for instance, an observation region that is as large as possible is desirable, or that the cleaning device for example in the case of windscreen wipers presents a technical disadvantage. Such a disadvantage may sometimes consist in the fact that the device increases the drag of motor vehicles, or that dirt deposits on the cleaning device itself. In the case of camera systems, optical monitoring devices, rear-vision mirrors or other optical systems, too, it is desirable for the field of view to be restricted as little as possible by the cleaning device.

In order to avoid these disadvantages, WO 2012/095643 A1 provides a device for removing rain or drizzle from the surface of a window. The device comprises the window and one or more piezoelectric transducers fixed to the window. The device according to WO 2012/095643 A1 is designed to vaporize the rain or drizzle by using ultrasonic waves, that is to say by means of ultrasound, wherein the ultrasonic waves are generated by the at least one piezoelectric transducer.

For transmitting the sound energy from the transducer into the substrate, the respective transducer has to be fixed to the substrate reliably and in an exactly defined manner. This can be done by means of a cohesive connection, for example. The fixing ensures that, firstly, the transducer remains on the substrate even during its operation and, secondly, the sound energy is transmitted into the substrate. It is regularly the case here that the materials of the transducer, the connection and the substrate differ from one another.

SUMMARY OF THE INVENTION

The invention is based on the object of improving a device for eliminating deposits and/or precipitation on a substrate to the effect of reducing losses during the transmission of the sound energy between the transducer and the substrate.

The main features of the invention are specified in the characterizing part of Claim 1. Claims 2 to 10 relate to configurations. The invention furthermore relates, according to Claim 11, to an optical system for environment monitoring comprising an optical monitoring device comprising the device for eliminating deposits and/or precipitation on a substrate.

In the case of a device for eliminating deposits and/or precipitation on a substrate, comprising at least one transducer captively connected to the substrate by a connection layer, wherein the connection layer is arranged between the substrate and the transducer, the invention provides for the connection layer to comprise a connection material and a filling material.

In one development of the invention, for example, a transparent material, an observation screen, a lens, a mirror or a protective screen can be provided as substrate, wherein the substrate can be single- or multilayered. A piezoelectric transducer, in particular a lead zirconate titanate transducer (PZT), can be provided as transducer, wherein the transducer can comprise, on the side facing the substrate, electrode arrangements which, in a more detailed configuration, intermesh in a comblike manner or like a zip fastener (interdigital transducer).

Optionally, different wave modes are generatable by the respective transducer in the case of a corresponding drive by a driver unit (not described in more specific detail here) and, if appropriate, a control and/or regulation unit. In this regard, surface waves and/or bulk waves can be generatable by the transducer. Bulk waves are longitudinal waves or transverse waves, for example. Longitudinal waves oscillate in the direction of propagation thereof. Transverse waves oscillate transversely with respect to the direction of propagation thereof. Surface waves arise for example as a result of refraction of bulk waves at boundary layers. The surface waves propagate perpendicularly to the oscillation direction thereof along an interface between two acoustically different media. By way of example, Love waves oscillate at the interface in a horizontal direction and propagate perpendicularly to the oscillation direction. Rayleigh waves oscillate in a vertical direction relative to the interface and propagate perpendicularly to the oscillation direction along the interface. The surface waves experience a high degree of damping in the material respectively situated on the other side of the interface. The sound waves generated by the transducer are preferably ultrasonic waves. Ultrasound is the frequency range which lies above the audible frequency range of human beings, and begins at approximately 16 kHz.

In one development of the invention, the connection layer is a layer which cohesively connects the transducer to the substrate. This can optionally be provided by an adhesive layer. Optionally, the connection material provides for the adhesion of the transducer on the substrate and has material-specific mechanical and acoustic connection material properties. Optionally, the filling material can likewise contribute to the adhesion, but can moreover also define a distance between the substrate and the transducer. The filling material likewise has material-specific mechanical and acoustic filling material properties. One development of the invention provides for the connection layer to connect the transducer, the substrate and/or the filling material to one another, in particular cohesively to one another, wherein a more detailed configuration of the invention provides for the connection layer to be substantially gas-free.

The provision of a connection layer composed of a connection material and a filling material affords the advantage that the connection layer is able to be influenced by selection of its material composition both with regard to its mechanical properties, i.e. for example density, hardness or viscosity, and with regard to its acoustic properties, such as sound propagation velocity, for example. In this way, it is possible to establish acoustic impedance differences or acoustic impedance contrasts between the respective field impedance of a material of the transducer and a material of the substrate. As a result, it is possible advantageously to influence whether and to what extent a reflection of the sound energy occurs at an interface between the transducer and the connection layer and between the connection layer and the substrate. Moreover, a further advantage is afforded by the fact that the transducer is able to be aligned precisely with respect to the substrate in particular by the selection of the filling material, which can impart a mechanical stability to the connection layer. A precise alignment of the transducer with respect to the substrate has the advantage that the sound waves generated by the transducer are optimally coupled into the substrate and propagate there in a defined manner.

A further configuration of the invention can provide for the acoustic and/or the mechanical properties of the connection layer to be set by the mass ratio between the connection material and the filling material. Optionally, provision is made for the mass ratio of the filling material to the connection material to be optimized with regard to the desired acoustic and/or mechanical properties of the device. The invention can be configured by the mass ratio of the filling material to the connection material. By way of the setting of the mass ratio, the acoustic and/or the mechanical properties of the connection layer can be influenced in an advantageous and simple manner since the connection material and the filling material merely have to be weighed out and admixed. The desired acoustic and/or mechanical properties can be determined experimentally or numerically, for example, depending on the mass ratio. In this way, the acoustic impedance contrasts between the transducer and the connection layer and between the connection layer and the substrate can be controlled in accordance with the desired use frequency range of the transducer and the respective medium of the transducer and the substrate.

A further embodiment of the invention is distinguished by the fact that the connection material comprises at least one material component which cures by means of radiation curing, in particular by means of UV rays, or thermally, wherein the acoustic and/or mechanical properties of the device are preferably able to be influenced by way of the curing process. Optionally, the invention is configured by the connection material comprising a two-component material which cures by means of radiation curing or thermally. Provision can be made for the connection material to be an epoxy resin. Radiation curing and/or thermal curing prove(s) to be advantageous because the curing can also take place indirectly. In this context, indirectly means that there need be no contact with another curing medium, such as oxygen, for example. This is advantageous particularly if the transducer is fitted to a transparent substrate by the connection layer. The connection layer, or the connection material in the connection layer, is then curable through the substrate, for example from the opposite side relative to the transducer.

A further configuration of the invention provides for the sound propagation velocity in the filling material to be different from the sound propagation velocity in the connection material. A more detailed configuration provides for the sound propagation velocity in the filling material to be higher than the sound propagation velocity in the connection material. Provision can also be made for the density of the filling material to be different from, preferably higher than, the density of the connection material. Moreover, provision can be made for the hardness of the filling material to be different from, preferably higher than, the hardness of the connection material. In this way, it is possible advantageously to establish the sound propagation velocity in the connection layer for controlling the impedance contrasts between transducer and connection layer and connection layer and substrate. The density and the hardness are further material properties which advantageously directly or indirectly influence the sound propagation velocity and the impedance of the connection material and of the filling material and thus also the impedance of the connection layer.

One development of the invention provides for the sound propagation in the connection layer to be anisotropic. This advantageously promotes the propagation of surface waves along the interface between transducer and substrate upon corresponding mechanical excitation by the transducer.

A further configuration of the invention provides for the filling material at least partly to consist of a silicate glass, in particular a borosilicate glass. Using one of the glasses above affords the advantage that the acoustic properties of the connection layer are adaptable to the acoustic properties of the substrate by way of the filling material. This is advantageous particularly if the substrate itself is a glass.

One particularly preferred embodiment of the invention provides for the filling material to produce a defined distance between the transducer and the substrate. The distance defined by the filling material is advantageous in particular with regard to the coupling of the transducer to the substrate and for the alignment of the transducer relative to the surface of the substrate.

A more detailed configuration of the invention can provide for at least one shaped body composed of the filling material to form an acoustic bridge as a result of a coupling to the transducer and the substrate. One development of the invention provides for the at least one shaped body to be a solid body, preferably a solid mass. The invention can be developed by the at least one shaped body having a dimensioning corresponding to the distance. Consequently, from a mechanical standpoint, a distance between the transducer and the substrate is advantageously fixedly and unambiguously defined by the filling material. The at least one shaped body can form a matrix comprising the filling material in the connection material. The acoustic coupling of the transducer to the substrate via the acoustic bridge of the filling material, that is to say the direct material contact of the connection material with the transducer and the substrate, affords the further advantage that inter alia the acoustic properties of the connection layer are able to be influenced thereby. In this way, the impedance contrasts between transducer and connection layer and between the connection layer and the substrate can additionally be advantageously influenced.

One development of the invention provides for the at least one shaped body to be spherical or rod-shaped. One development of the invention provides for the diameter of the at least one spherical or rod-shaped shaped body to correspond to a fraction of an operating frequency of the transducer. A configuration can provide for the diameter of the at least one spherical or rod-shaped shaped body. One development optionally provides for the at least one rod-shaped shaped body to be arranged horizontally or upright. The spherical or rod-shaped configuration of the at least one shaped body advantageously has the result that the shaped body or shaped bodies is/are able to be distributed well in the connection material and is/are always present in a defined position in the connection material, which has a positive influence on the transmission of the sound waves from the transducer to the substrate.

A further configuration of the invention can provide for the connection material to be arranged at an interface between the at least one shaped body and the transducer and at an interface between the at least one shaped body and the substrate. One development of the invention provides for the connection layer to be provided for coupling surface waves and/or bulk waves generated by the transducer into the substrate. A further possibility of influencing the acoustic and mechanical properties of the connection layer is thus advantageously afforded.

A further configuration of the invention provides for the device furthermore to comprise a generator for generating a driver signal in a frequency range above 100 kHz for driving a transducer. By virtue of the fact that a generator is provided and the driver signal for the transducer is in a frequency range of above 100 kHz, surface contaminants such as, for example, precipitation or other deposits can be removed particularly efficiently by means of the ultrasonic waves introduced into the precipitation or the other deposits, by the vaporization and/or movement thereof.

The invention additionally relates to an optical system for environment monitoring comprising an optical monitoring device comprising a lens and/or an observation window and the device described above and the configurations thereof, wherein the lens or the observation window is formed by the substrate. The use of the above device proves to be advantageous in particular for an optical system for environment monitoring because the use of the at least one transducer on the lens or the observation window ensures that an observation region or monitoring region of the optical system remains unimpaired to the greatest possible extent.

BRIEF DESCRIPTION OF THE SEVERAL VIEWS OF THE DRAWINGS

Further features, details and advantages of the invention are evident from the wording of the claims and from the following description of exemplary embodiments with reference to the drawings, in which:

DESCRIPTION OF SPECIFIC EMBODIMENTS OF THE INVENTION

Figure 1:
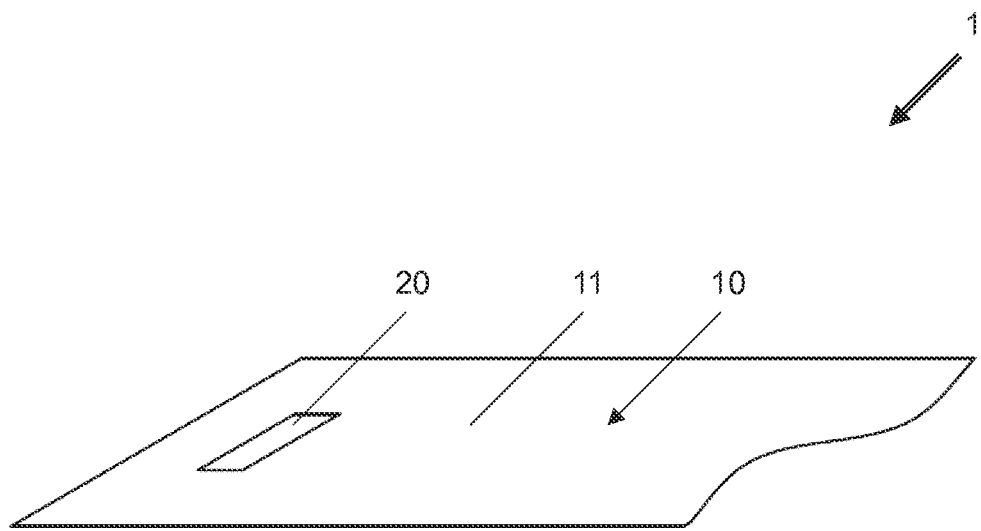
FIG. 1 shows a schematic, perspective view of the substrate with a transducer arranged thereon.

FIG. 1 shows a schematic, perspective view of the device 1 for eliminating deposits and/or precipitation on a substrate 10 with a transducer 20 arranged on the substrate 10 according to a first embodiment, wherein the substrate is arranged on a surface 11 of the substrate.

Figure 2:
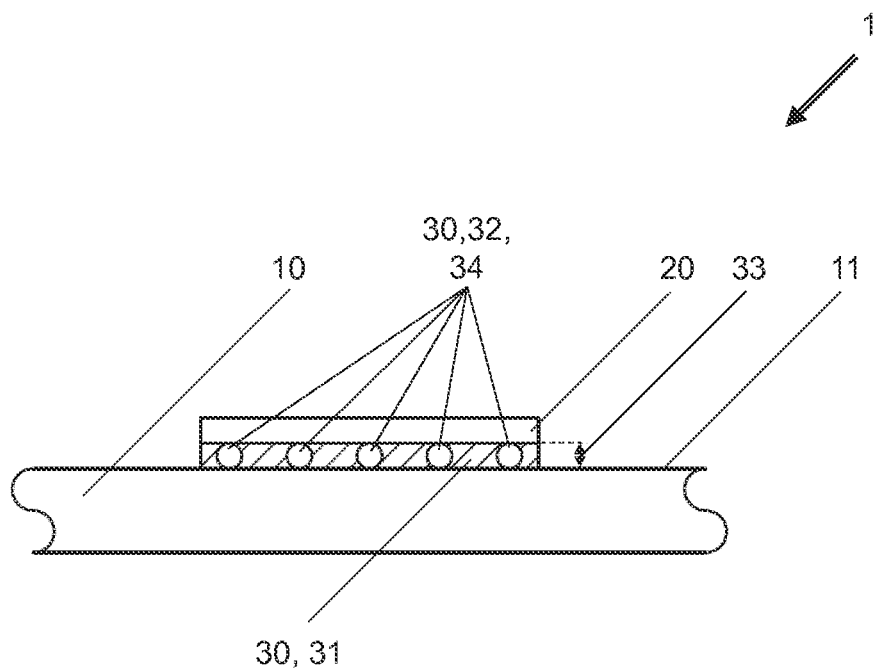
FIG. 2 shows a schematic, sectional view of the substrate with a transducer arranged thereon according to a first embodiment.

FIG. 2 shows a schematic, sectional view of the device 1 for eliminating deposits and/or precipitation on a substrate 10 with a transducer 20 arranged on the substrate 10 according to a first embodiment. The transducer is arranged on a surface 11 of the substrate 10. A connection layer 30 comprising a connection material 31 and a filling material 32 lies between the substrate 10 and the transducer 20.

In the present first embodiment, the filling material 32 in the form of shaped bodies 34 embodied as spheres or cylinders lies in the connection material 31. The shaped bodies 34 form a matrix for the connection material 31, such that the connection layer 30 is accordingly constructed from two components. The thickness of the connection layer 30 is defined by the distance 33 prescribed by the shaped bodies 34. The shaped bodies 34 bear both directly against the transducer 20 and directly against the substrate 10 and form an acoustic bridge.

Figure 3:
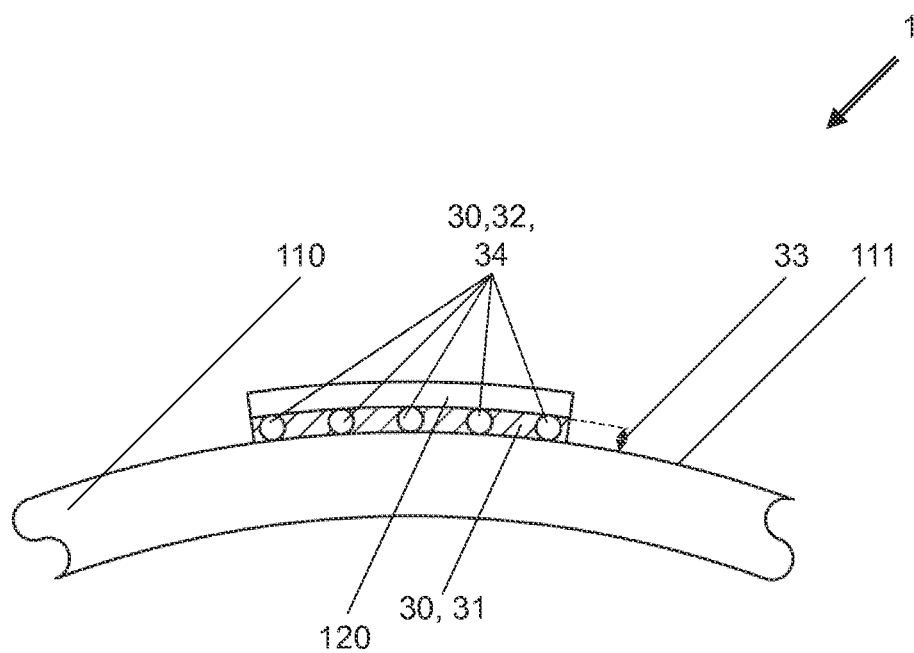
FIG. 3 shows a schematic, sectional view of the substrate with a transducer arranged thereon according to a second embodiment.

FIG. 3 shows a schematic, sectional view of the device 1 for eliminating deposits and/or precipitation on a substrate 110 with a transducer 120 arranged on the substrate 110 according to a second embodiment.

The surface 111 of the substrate 110 facing the transducer 120 is curved. In the surface facing the substrate 110, the transducer 120 has a curvature substantially corresponding to the curvature of the surface 111.

In this embodiment, too, the filling material 32 in the form of shaped bodies 34 embodied as spheres or cylinders lies in the connection material 31, wherein the shaped bodies 34 form a matrix for the connection material 31. The connection layer 30 is accordingly constructed from two components. The shaped bodies 34 bear both directly against the transducer 120 and directly against the substrate 110 and form an acoustic bridge. The thickness of the connection layer 30 is defined by the distance 33 prescribed by the shaped bodies 34.

Figure 4:
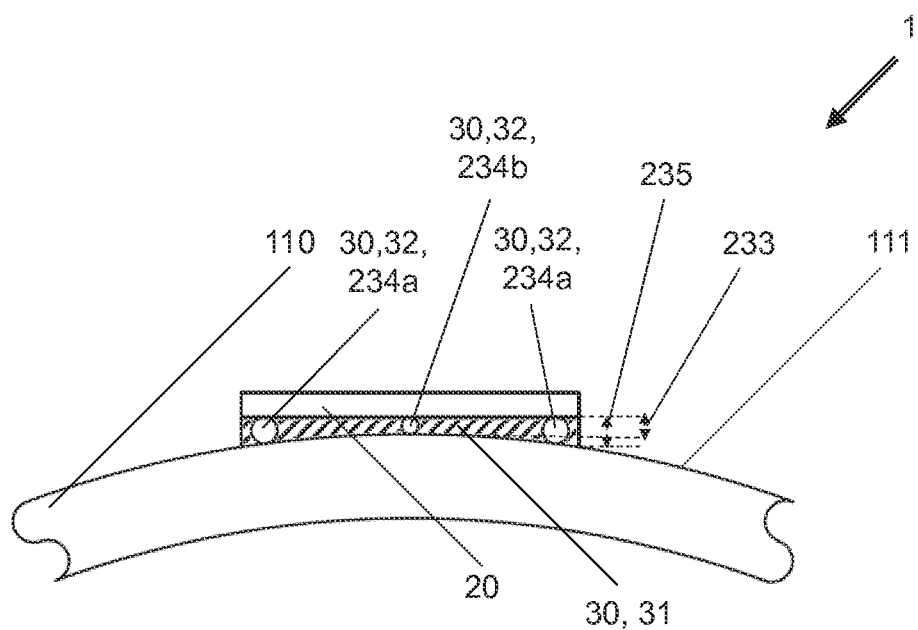
FIG. 4 shows a schematic, sectional view of the substrate with a transducer arranged thereon according to a third embodiment.

FIG. 4 shows a schematic, sectional view of the device 1 for eliminating deposits and/or precipitation on a substrate 110 with a transducer 20 arranged on the substrate 110 according to a third embodiment.

In this embodiment, the surface 111 of the substrate 110 facing the transducer 20 is curved, wherein the surface of the transducer 20 facing the substrate 110 has substantially no curvature. Accordingly, the distance 233, 235 between the transducer 20 and the surface 111 of the substrate 110 varies.

The shaped bodies 234a, 234b composed of the filling material 32 have different diameters in order to compensate for the varying distance 233, 235 between the surface 111 and the transducer 20. In this case, the shaped bodies 234a, 234b bear both against the surface 111 of the substrate 110 and against the transducer 20 and form an acoustic bridge.

The interspace between the transducer 20 and the surface 111 is filled with the connection material 31 alongside the filling material 32.

The invention is not restricted to any of the embodiments described above, but rather is modifiable in diverse ways. Provision can be made, for example, for the filling material 32 to be embedded in the connection material 31 and not to consist of discrete shaped bodies 34, but rather to be admixed with the connection material.

As an alternative thereto, provision can be made for the at least one shaped body 34, 234a, 234b to be a structure body having a preferably regular structure, in particular a net structure or a honeycomb structure.

All features and advantages emerging from the claims, the description and the drawing, including structural details, spatial arrangements and method steps, may be essential to the invention both by themselves and in a wide variety of combinations.

LIST OF REFERENCE SIGNS

1 Device
10, 110 Substrate 11, 111 Surface
20, 120 Transducer
30 Connection layer
31 Connection material
32 Filling material
33, 233 First distance
34, 234a, 234b Shaped body
35, 235 Second distance

What is claimed is:

1. A device (1) for eliminating deposits and/or precipitation on a substrate (10), comprising
at least one transducer (20, 120) captively connected to the substrate (10, 110) by a connection layer (30), wherein
the connection layer (30) is arranged between the substrate (10, 110) and the transducer (20, 120),
wherein the connection layer (30) comprises a connection material (31) and a filling material (32), wherein
at least one of acoustic and mechanical properties of the connection layer (30) is set by a mass ratio between the connection material (31) and the filling material (32),
wherein at least one of a sound propagation velocity, density, and hardness is different in the filling material (32) than in the connection material (31),
wherein a distance between the transducer (20, 120) and the substrate (10, 110) is fixedly and unambiguously defined by the filling material (32),
and wherein at least one shaped body of the filling material (32) forms a matrix comprising the filling material (32) in the connection material (31), thereby constituting an acoustic coupling of the transducer (20, 120) to the substrate (10, 110) via an acoustic bridge.

2. The device (1) according to claim 1, wherein the sound propagation velocity in the tilling material (32) is different from the sound propagation velocity in the connection material (31).

3. The device (1) according to claim 1, wherein the filling material (32) at least partly consists of a silicate glass.

4. The device (1) according to claim 1, wherein the at least one shaped body (34, 234a, 234b) is spherical or rod-shaped.

5. The device (1) according to claim 1, wherein the connection material (31) is arranged at an interface between the at least one shaped body (34, 234a, 234b) and the transducer (20, 120) and at an interface between the at least one shaped body (34, 234a, 234b) and the substrate (10, 110).

6. The device (1) according to claim 1, wherein the connection layer (30) is provided for coupling surface waves and/or bulk waves generated by the transducer (20, 120) into the substrate (10, 110).

7. The device (1) according to claim 1, wherein the device (1) furthermore comprises a generator for generating a driver signal in a frequency range above 100 kHz for driving a transducer (20, 120).

8. An optical system for environment monitoring comprising an optical monitoring device comprising a lens and/or an observation window and the device according to claim 1, wherein the lens or the observation window is formed by the substrate.

* * * * *